(12) United States Patent
Hai

(10) Patent No.: US 11,867,993 B2
(45) Date of Patent: Jan. 9, 2024

(54) DISPLAY DEVICE WITH FINGERPRINT RECOGNITION FUNCTION

(71) Applicant: BOE TECHNOLOGY GROUP CO., LTD., Beijing (CN)

(72) Inventor: Xiaoquan Hai, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 190 days.

(21) Appl. No.: 17/437,102

(22) PCT Filed: Jan. 8, 2021

(86) PCT No.: PCT/CN2021/070837
§ 371 (c)(1),
(2) Date: Sep. 8, 2021

(87) PCT Pub. No.: WO2021/139760
PCT Pub. Date: Jul. 15, 2021

(65) Prior Publication Data
US 2022/0179253 A1    Jun. 9, 2022

(30) Foreign Application Priority Data
Jan. 10, 2020   (CN) .......................... 202010026417.0

(51) Int. Cl.
*G06V 40/13* (2022.01)
*G02F 1/1333* (2006.01)
(Continued)

(52) U.S. Cl.
CPC ......... *G02F 1/13338* (2013.01); *G02B 6/002* (2013.01); *G02F 1/133512* (2013.01); *G02F 1/133528* (2013.01); *G06V 40/1318* (2022.01)

(58) Field of Classification Search
CPC ........... G02F 1/13338; G02F 1/133512; G02F 1/133528; G06V 40/1318; G02B 6/002
(Continued)

(56) References Cited

U.S. PATENT DOCUMENTS

2012/0199625 A1* 8/2012 Qi .......................... B28D 1/222
225/2
2017/0177921 A1 6/2017 Fornof et al.
(Continued)

FOREIGN PATENT DOCUMENTS

CN         106326855 A    1/2017
CN         109409346 A    3/2019
(Continued)

OTHER PUBLICATIONS

China Patent Office, First Office Action dated Apr. 28, 2023 for application No. CN202010026417.0.
(Continued)

*Primary Examiner* — Abdul-Samad A Adediran
(74) *Attorney, Agent, or Firm* — HOUTTEMAN LAW LLC

(57) ABSTRACT

The present disclosure provides a display device having a fingerprint recognition function. The display device includes: a light source; a fingerprint recognition component including a finger contact substrate, the light source and the finger contact substrate having a gap therebetween; and a light guiding layer at least partially filling the gap and configured to guide light emitted by the light source towards the finger contact substrate.

15 Claims, 4 Drawing Sheets

(51) Int. Cl.
  *G02F 1/1335* (2006.01)
  *F21V 8/00* (2006.01)
(58) Field of Classification Search
  USPC .............................................. 225/2
  See application file for complete search history.

(56) References Cited

U.S. PATENT DOCUMENTS

2018/0005007 A1    1/2018  Du et al.
2022/0343671 A1*  10/2022  Michalsky ............. G02B 6/002

FOREIGN PATENT DOCUMENTS

| CN | 109765724 A   | 5/2019 |
| CN | 110045557 A   | 7/2019 |
| CN | 110174794 A   | 8/2019 |
| CN | 110222620 A   | 9/2019 |
| CN | 111242012 A   | 6/2020 |
| WO | 2016122282 A1 | 8/2016 |

OTHER PUBLICATIONS

Zhu et al., "Study on optically clear contrast enhancement film performance," Adhesion, Mar. 10, 2011.

* cited by examiner

DISPLAY DEVICE WITH FINGERPRINT RECOGNITION FUNCTION

CROSS REFERENCE TO RELATED APPLICATIONS

The present application claims priority to Chinese patent application No. 202010026417.0 filed on Jan. 10, 2020 to National Intellectual Property Administration, PRC, the content of which is incorporated herein by reference in its entirety.

TECHNICAL FIELD

The present disclosure relates to the field of display technologies, and in particular, to a display device having a fingerprint recognition function.

BACKGROUND

A current display device mainly includes a liquid crystal display device and an organic light emitting diode (OLED) display device. The liquid crystal display device includes a liquid crystal display panel and a backlight module, and realizes displaying by controlling deflections of liquid crystal molecules in the liquid crystal display panel. The OLED display device includes an organic light emitting diode package and a covering plate, does not need a backlight source, and can emit light when current passes through the OLED display device so as to realize displaying. A fingerprint recognition sensor is also generally provided in the display device to improve convenience in use of the display device.

SUMMARY

An aspect of the present disclosure provides a display device with a fingerprint recognition function including: a light source; a fingerprint recognition component including a finger contact substrate, the light source and the finger contact substrate having a gap therebetween; and a light guide layer at least partially filling the gap and configured to guide light emitted by the light source towards the finger contact substrate.

According to an embodiment of the present disclosure, the light guide layer is a transparent material layer having a refractive index of at least 1.5, and the transparent material layer completely fills the gap.

According to an embodiment of the present disclosure, the transparent material layer is made of silicone oil and optical adhesive.

According to an embodiment of the present disclosure, the transparent material layer is made of optical adhesive.

According to an embodiment of the present disclosure, the light guide layer is a polarizer having haze.

According to an embodiment of the present disclosure, the polarizer having the haze partially fills the gap and is located at a side of the gap close to the light source.

According to an embodiment of the present disclosure, the haze of the polarizer is 5% to 60%.

According to an embodiment of the present disclosure, the light guide layer is constituted by a waveguide.

According to an embodiment of the present disclosure, the display device further includes a liquid crystal display panel, the light source is a backlight module, the liquid crystal display panel is located between the finger contact substrate and the backlight module, and the gap is located between the backlight module and the liquid crystal display panel.

According to an embodiment of the present disclosure, the liquid crystal display panel includes a lower substrate structure, an upper substrate structure and a liquid crystal layer between the upper substrate structure and the lower substrate structure, and the backlight module is located at a side of the lower substrate structure facing away from the liquid crystal layer, the finger contact substrate is located at a side of the upper substrate structure facing away from the liquid crystal layer, and the gap is located between the backlight module and the lower substrate structure.

According to an embodiment of the present disclosure, the display device further includes a first polarizer and a second polarizer, the first polarizer is located between the finger contact substrate and the upper substrate structure, the second polarizer is located between the lower substrate structure and the backlight module, and the gap is located between the second polarizer and the lower substrate structure or between the second polarizer and the backlight module.

According to an embodiment of the present disclosure, the upper substrate structure includes an upper substrate and a color film layer, the color film layer is located at a side of the upper substrate close to the liquid crystal layer and includes a plurality of color resist blocks.

According to an embodiment of the present disclosure, the fingerprint recognition component further includes a fingerprint recognition sensor located between the upper substrate and the color film layer, the color film layer further includes a black matrix between the plurality of color resist blocks, and an orthographic projection of the fingerprint recognition sensor on the upper substrate and an orthographic projection of the plurality of color resist blocks do not overlap with each other.

According to an embodiment of the present disclosure, the fingerprint recognition component further includes a fingerprint recognition sensor located in the color film layer and between the plurality of color resist blocks.

According to an embodiment of the present disclosure, the fingerprint recognition component further includes a filter layer configured to allow light within a spectral range of the filter layer to pass through, the filter layer is located at a side of the fingerprint recognition sensor facing away from the liquid crystal layer, the orthographic projection of the fingerprint recognition sensor on the upper substrate is located within an orthographic projection of the filter layer on the upper substrate, and the orthographic projection of the filter layer on the upper substrate and the orthographic projection of the plurality of color resist blocks on the upper substrate do not overlap with each other.

According to an embodiment of the present disclosure, the spectral range is 380 nm to 600 nm, or 480 nm to 580 nm.

According to an embodiment of the present disclosure, the light source is an organic light emitting diode package, and the display device with the fingerprint recognition function further includes a capping layer between the organic light emitting diode package and the finger contact substrate, and the gap is located between the organic light emitting diode package and the capping layer.

According to an embodiment of the present disclosure, the fingerprint recognition component further includes a fingerprint recognition sensor located in the capping layer or at a side of the organic light emitting diode package facing away from the capping layer.

According to an embodiment of the present disclosure, the display device further includes a filter layer located at a side of the fingerprint recognition sensor for receiving light reflected by a finger.

BRIEF DESCRIPTION OF THE DRAWINGS

The above and/or additional aspects and advantages of the present disclosure will become apparent and readily appreciated from following descriptions of embodiments in conjunction with accompanying drawings in which.

DETAILED DESCRIPTION

Figure 1:
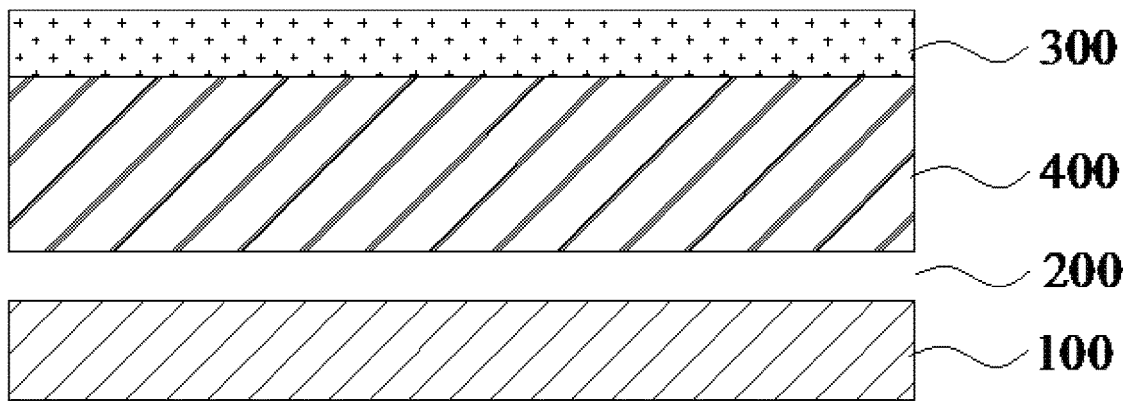
FIG. 1 is a structural schematic diagram of a display device with a fingerprint recognition function.

Reference will now be made in detail to the embodiments of the present disclosure, examples of which are illustrated in the accompanying drawings, wherein like reference numerals refer to the same or similar elements or elements having the same or similar functions throughout. The embodiments described below with reference to the accompanying drawings are illustrative only for a purpose of explaining the present disclosure, and are not to be construed as limiting the present disclosure.

FIG. 1 is a structural schematic diagram of a display device with a fingerprint recognition function.

Referring to FIG. 1, the display device includes a light source 100 and a fingerprint recognition component including a finger contact substrate 300, a sensor (not shown) and the like, the light source 100 is configured to emit light to the finger contact substrate 300 such that the light will be reflected by a finger on the finger contact substrate 300, and the sensor is configured to receive the light reflected by the finger, thereby performing a fingerprint recognition.

During manufacturing of the display device, a gap (i.e., an air layer or a vacuum layer) 200 is generally present between the light source 100 and the finger contact substrate 300 due to a process limitation. When a point light source scheme is used for performing the fingerprint recognition, in order to enable the light emitted from the light source 100 to irradiate the whole fingerprint on the finger contact substrate 300, the light source 100 needs to emit light with a large exiting angle to accurately recognize the fingerprint.

When the display device is a liquid crystal display device, the light source 100 employs a backlight module, and the liquid crystal display device further includes a liquid crystal display panel 400. When assembling the liquid crystal display device, the gap 200 usually exists between the backlight module 100 and the liquid crystal display panel 400. Due to the existence of the gap 200, when the backlight module 100 emits the light with the large exiting angle to perform the fingerprint recognition, the light with the large exiting angle may be totally reflected at an interface between the backlight module 100 and the gap 200, so that the light may not reach the finger contact substrate 300, thereby affecting a performance of the fingerprint recognition.

When the display device is an OLED display device, the light source 100 employs an OLED package, and the OLED display device further includes a capping layer 400. The capping layer 400 includes various film layers disposed above the OLED package 100 in the OLED display device. When assembling the OLED package, the capping layer 400 is usually pasted on the OLED package 100 (i.e., on a light emitting side) in a frame pasting manner. This manufacturing process results in the gap 200 between the OLED package 100 and the capping layer 400. Due to the existence of the gap 200, when the OLED package 100 emits the light with the large exiting angle, the light may be totally reflected at the interface between the OLED package 100 and the gap 200, so that the light cannot reach the finger contact substrate 300, thereby affecting the performance of the fingerprint recognition.

Figure 2:
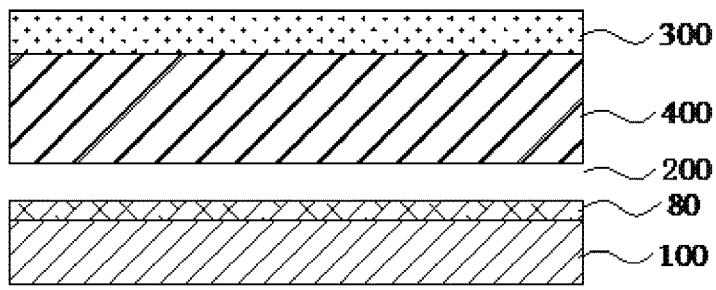
FIG. 2 is a structural schematic diagram of a display device with a fingerprint recognition function according to an embodiment of the present disclosure.

FIG. 2 is a structural schematic diagram of a display device with a fingerprint recognition function according to an embodiment of the disclosure.

Referring to FIG. 2, the display device according to the embodiment of the present disclosure includes a light source 100 and a fingerprint recognition component including a finger contact substrate 300 (in FIG. 2, only the finger contact substrate 300 of the fingerprint recognition component is shown, and other portions of the fingerprint recognition component are not shown). The light source 100 and the finger contact substrate 300 have a gap 200 therebetween, and a light guide layer 80 at least partially fills the gap 200. The light guide layer 80 is configured to guide light emitted from the light source 100 towards the finger contact substrate 300.

According to an embodiment of the present disclosure, the light guide layer 80 may be a transparent material layer having a refractive index of at least 1.5, and the transparent material layer completely fills the gap 200 (in order to facilitate understanding, a case where the light guide layer 80 partially fills the gap 200 is shown in FIG. 2), i.e., there is no gap between the transparent material layer and the finger contact substrate 300.

According to an embodiment of the present disclosure, the transparent material layer 80 is formed of a transparent material having a refractive index of 1.5.

According to an embodiment of the present disclosure, the transparent material layer 80 may be formed of silicone oil and optical adhesive. For example, the optical adhesive may be provided at an edge of the gap 200 to encapsulate the silicone oil inside.

According to an embodiment of the present disclosure, the transparent material layer 80 may be entirely formed of the optical adhesive. The transparent material layer 80 may also be formed of another transparent material having a refractive index of 1.5 or more.

According to an embodiment of the present disclosure, the light guide layer 80 may also be a polarizer having haze, which may partially fill the gap 200 and is located at a side of the gap 200 close to the light source 100.

According to an embodiment of the present disclosure, the haze of the polarizer 80 may be 5% to 60%, such as 5%, 10%, 20%, 30%, 40%, 50%, or 60%.

The haze of the polarizer may be selected according to a desired range of a light beam obtained by diffusing light emitted from the light source 100 through the polarizer 80.

According to an embodiment of the present disclosure, in a case where the light guide layer 80 employs the polarizer with the haze, since the polarizer with the haze can diffuse the light emitted by the light source 100, that is, light with a large exiting angle is prevented from being totally reflected on an interface between the light source 100 and the gap 200, it is possible to allow an existence of a gap between the polarizer 80 with the haze and the finger contact substrate 300, and the gap may also be filled with the silicone oil, the optical adhesive or the like.

According to an embodiment of the present disclosure, the light guide layer 80 may be constituted by a waveguide having a location matching a light emitting position of the light source 100, so that the light emitted from the light source 100 enters the waveguide and then is guided towards the finger contact substrate 300 through the waveguide.

According to an embodiment of the disclosure, the gap 200 is formed between the light source 100 and the finger contact substrate 300, and by arranging the polarizer 80 with the haze of 5% to 60% on a surface of the light source 100 which is a light exiting side (the haze enables the polarizer to have a diffusion function), the polarizer 80 can diffuse the light emitted by the light source 100, so that the light with the larger exiting angle emitted by the light source 100 can be incident into the gap 200 between the light source 100 and the finger contact substrate 300 and emitted to a finger at a side of the finger contact substrate 300 facing away from the light source 100, and thus more light can be emitted to the finger, so as to improve sensitivity of a fingerprint recognition of the display device.

According to an embodiment of the disclosure, by filling the transparent material layer 80 in the gap 200 between the light source 100 and the finger contact substrate 300, that is, eliminating the air layer or the vacuum layer between the light source and the finger contact substrate in the current display device, and setting the refractive index of the transparent material layer 80 to be greater than 1, the light with the larger exiting angle can be emitted to the finger at the side of the finger contact substrate 300 facing away from the light source through the transparent material layer, so that more light can be emitted to the finger, thereby improving the sensitivity of the fingerprint recognition of the display device.

According to an embodiment of the present disclosure, the light emitted to the finger is reflected by the finger and then is received by a fingerprint recognition sensor in the fingerprint recognition component and converted into an electric signal. Since an intensity of light reflected by a valley of the fingerprint is different from an intensity of light reflected by a ridge of the fingerprint, electric signals to which it is converted through the fingerprint recognition sensor are different, and thus the fingerprint recognition can be realized. Since the display device according to the present disclosure can make more light to be emitted to the finger, the intensities of the light reflected by the valley and the ridge of the fingerprint will be increased, thereby improving the sensitivity of the fingerprint recognition.

The display device according to an embodiment of the present disclosure may be a liquid crystal display device or an OLED display device. In a case where the display device is the liquid crystal display device, the light source 100 is the backlight module, and the display device may further include the liquid crystal display panel 400. In a case where the display device is the OLED display device, the light source 100 is the OLED package, the display device may further include the capping layer 400, and the capping layer 400 is located between the light source 100 and the finger contact substrate 300. According to a fingerprint recognition mode (e.g., an on-screen recognition mode or an under-screen recognition mode), the capping layer 400 may include different structures. For example, when the on-screen recognition mode is employed, the capping layer 400 may include a sensor for receiving the light reflected by the fingerprint and a glass cover plate, a polarizer, a touch panel or the like for covering the sensor, and when the under-screen recognition mode is employed, the sensor may be disposed under the OLED package, and the capping layer 400 may include a glass cover plate, a polarizer, a touch panel or the like.

The liquid crystal display device will be described in detail with reference to FIGS. 3 to 7.

Figure 3:
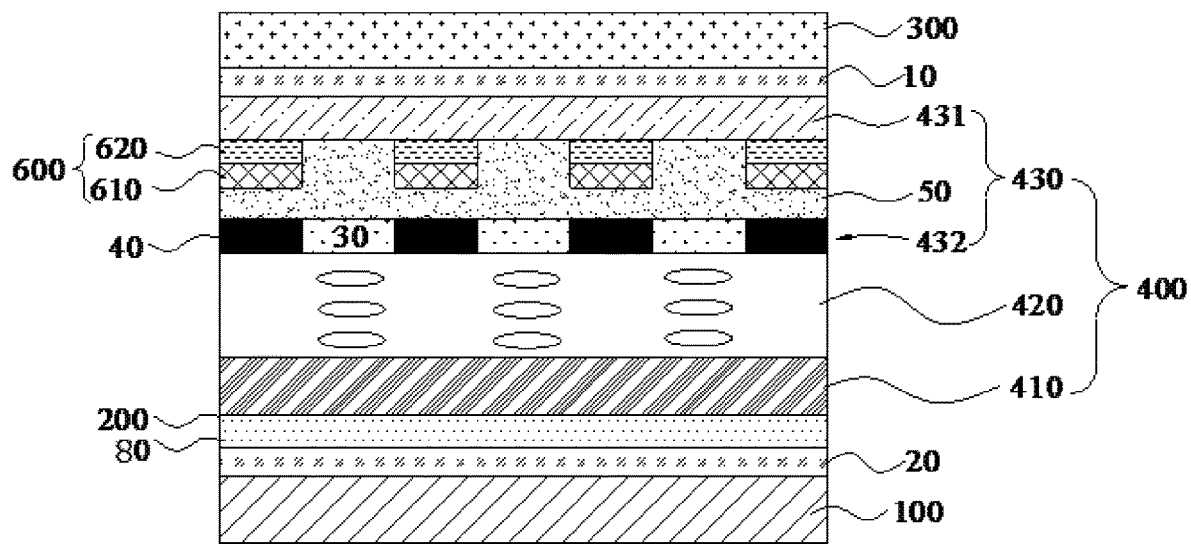
FIG. 3 is a detailed structural schematic diagram of a liquid crystal display device according to an embodiment of the present disclosure.

FIG. 3 is a detailed structural schematic diagram of a liquid crystal display device according to an embodiment of the present disclosure.

Referring to FIG. 3, the liquid crystal display device may include a light source 100, a fingerprint recognition component and a liquid crystal display panel 400. The fingerprint recognition component includes a finger contact substrate 300. The light source 100 is a backlight module. The liquid crystal display panel 400 is located between the finger contact substrate 300 and the backlight module 100, a gap 200 is located between the backlight module 100 and the liquid crystal display panel 400, and a light guide layer 80 at least partially fills the gap 200 (FIG. 3 shows a case where the light guide layer 80 completely fills the gap 200). Therefore, light emitted by the backlight module first passes through the light guide layer 80, so that light with a large exiting angle emitted by the backlight module 100 can be incident into the liquid crystal display panel 400 and irradiate a finger at a side of the finger contact substrate 300 facing away from the backlight module 100 through the liquid crystal display panel 400, so that more light is emitted to the finger, thereby improving sensitivity of a fingerprint recognition of the display device.

According to an embodiment of the present disclosure, the liquid crystal display panel 400 includes a lower substrate structure 410, a liquid crystal layer 420 and an upper substrate structure 430. The liquid crystal layer 420 is located between the lower substrate structure 410 and the upper substrate structure 430, the backlight module 100 is located at a side of the lower substrate structure 410 facing away from the liquid crystal layer 420, and the gap 200 is located between the backlight module 100 and the lower substrate structure 410.

According to the embodiment of the present disclosure, a first polarizer 10 is disposed between the finger contact substrate 300 and the upper substrate structure 430, and a second polarizer 20 is disposed between the lower substrate structure 410 and the backlight module 100. Depending on a manufacturing process of the liquid crystal display device, the gap 200 may be located between the second polarizer 20 and the backlight module 100, or between the lower substrate structure 410 and the second polarizer 20. A case where the gap 200 is located between the lower substrate structure 410 and the second polarizer 20 is illustrated in FIG. 3. For example, the gap 200 may exist between the liquid crystal display panel 400 and the backlight module 100 due to a process of assembling the already-manufactured liquid crystal display panel 400 on the already-manufactured backlight module 100. If the second polarizer 20 is formed together in a process of manufacturing the liquid crystal display panel 400 (e.g., in a process of manufacturing the lower substrate structure 410), the gap 200 may be located between the second polarizer 20 and the backlight module 100. If the second polarizer 20 is formed together in a process of manufacturing the backlight module 100, the gap 200 is located between the lower substrate structure 410 and the second polarizer 20 (as shown in the case of FIG. 3). A polarization direction of the first polarizer 10 is orthogonal to a polarization direction of the second polarizer 20 to prevent the light emitted from the backlight module 100 from irradiating the finger touch panel 300 through a portion of liquid crystals in the liquid crystal layer 420 in a case where the portion of liquid crystals is undesirably deflected.

According to an embodiment of the present disclosure, when the light guide layer 80 employs a polarizer having haze, in order to ensure that the light emitted from the backlight module 100 can enter into the liquid crystal panel 400, a polarization direction of the polarizer having the haze and the polarization direction of the second polarizer 20 are not orthogonal, for example, the polarization directions of the polarizer having the haze and the second polarizer 20 may be the same, thereby allowing the light to enter into the liquid crystal panel 400.

According to an embodiment of the present disclosure, the upper substrate structure 430 may include an upper substrate 431 and a color film layer 432, the color film layer 432 is located at a side of the upper substrate 431 close to the liquid crystal layer 420, and the color film layer 432 includes a plurality of color resist blocks 30. In addition, the color film layer 432 further includes a black matrix 40, and the black matrix 40 is located between the color resist blocks 30.

According to an embodiment of the present disclosure, the fingerprint recognition component further includes a fingerprint recognition sensor 600 including a thin film transistor 620 and a photodiode 610 electrically connected to each other, and the thin film transistor 620 is located at a side of the photodiode 610 close to the finger contact substrate 300. The fingerprint recognition sensor 600 may be disposed in the upper substrate structure 430. For example, as shown in FIG. 3, the fingerprint recognition sensor 600 is located between the upper substrate 431 and the color film layer 432, and an orthogonal projection of the fingerprint recognition sensor 600 on the upper substrate 431 and an orthogonal projection of the color resist blocks 30 on the upper substrate 431 do not overlap with each other. Thus, the fingerprint recognition can be realized by the fingerprint recognition sensor 600, and the fingerprint recognition sensor 600 does not affect displaying of the liquid crystal display device. According to an embodiment of the present disclosure, when the fingerprint recognition sensor 600 is disposed in the upper substrate structure 430, a side of the photodiode 610 close to the finger contact substrate 300 is a light incident side, and light reflected by the finger can irradiate the photodiode 610 through an insulating layer in the thin film transistor 620.

According to an embodiment of the present disclosure, referring to FIG. 3, the fingerprint recognition sensor 600 may be located between the upper substrate 431 and the color film layer 432, and the orthogonal projection of the fingerprint recognition sensor 600 on the upper substrate 431 coincides with an orthogonal projection of the black matrix 40 on the upper substrate 431, so that the orthogonal projection of the fingerprint recognition sensor 600 on the upper substrate 431 and the orthogonal projection of the color resist blocks 30 on the upper substrate 431 may not overlap with each other, thereby not affecting the displaying of the liquid crystal display device. According to an embodiment of the present disclosure, a planarization layer 50 may be further disposed at a side of the fingerprint recognition sensor 600 facing away from the upper substrate 431 to provide a flat surface.

Figure 4:
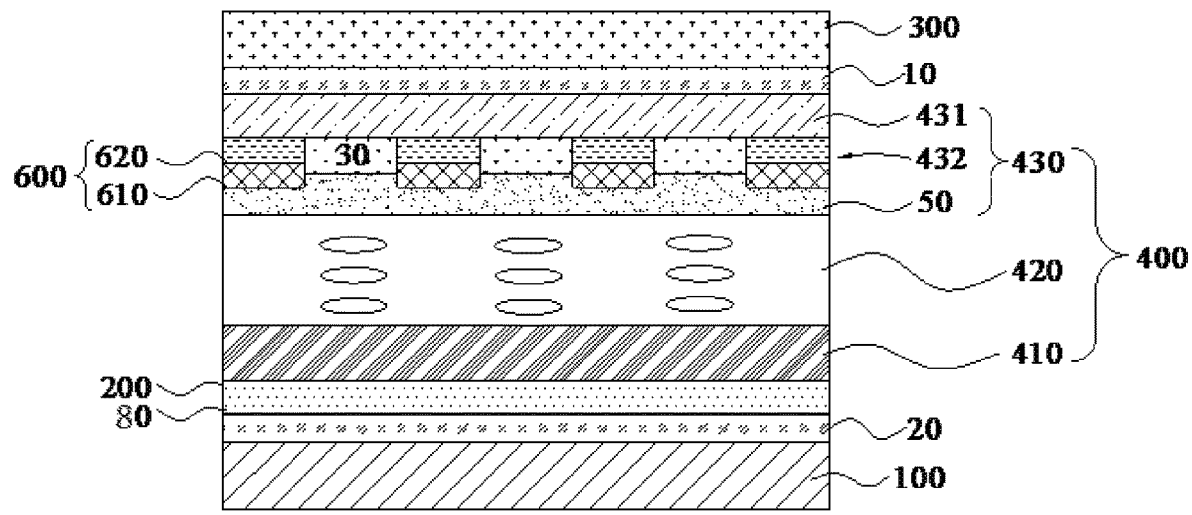
FIG. 4 is a detailed structural schematic diagram of a liquid crystal display device according to another embodiment of the present disclosure.

FIG. 4 is a detailed structural view of a liquid crystal display device according to another embodiment of the present disclosure. The liquid crystal display device shown in FIG. 4 has a similar structure to the liquid crystal display device shown in FIG. 3, and only portions shown in FIG. 4 that differ from those shown in FIG. 3 will be described herein in order to avoid repetition.

Referring to FIG. 4, the fingerprint recognition sensor 600 may be located in the color film layer 432, in which case the fingerprint recognition sensor 600 is located between the color resist blocks 30, that is, the fingerprint recognition sensor 600 replaces the black matrix 40 shown in FIG. 3, so that an orthographic projection of the fingerprint sensor 600 on the upper substrate 431 and an orthographic projection of the color resist blocks 30 on the upper substrate 431 may not overlap with each other, thereby not affecting displaying of the liquid crystal display device. According to an embodiment of the present disclosure, a planarization layer 50 may be further provided at a side of the fingerprint recognition sensor 600 and the color resist blocks 30 facing away from the upper substrate 431 to provide a flat surface.

Figure 5:
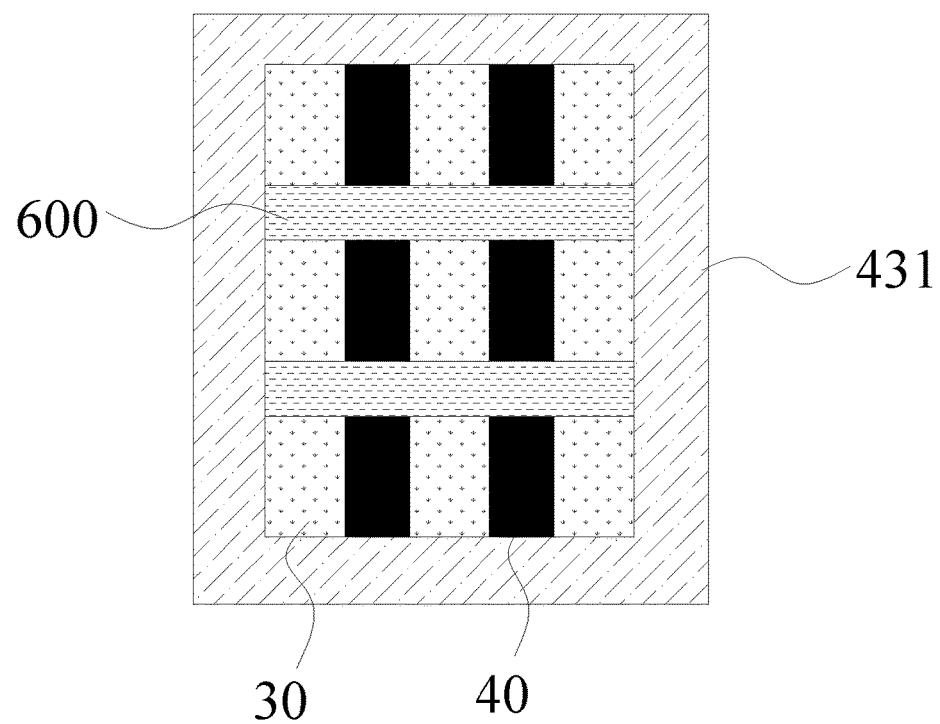
FIGS. 5 and 6 are schematic views illustrating orthographic projections of a fingerprint recognition sensor, a color resist block, and a black matrix on an upper substrate.
Figure 6:
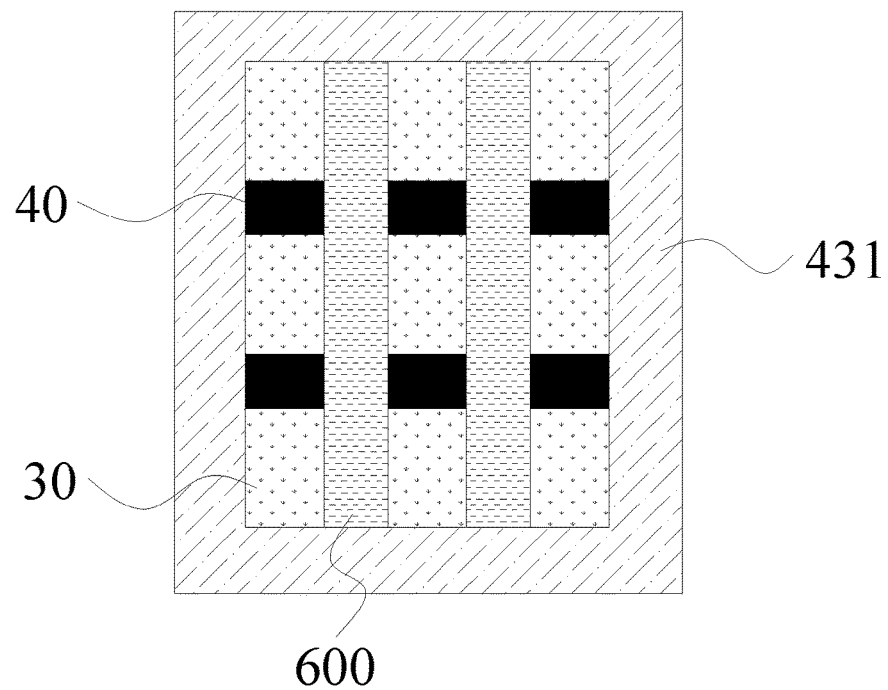

FIGS. 5 and 6 are schematic views illustrating orthogonal projections of the fingerprint recognition sensor 600, the color resist block 30, and the black matrix 40 on the upper substrate 431.

Referring to FIG. 5, the orthographic projections of the color resist blocks 30 and the black matrix 40 in the color film layer 432 on the upper substrate 431 are arranged in a plurality of rows, and the orthographic projection of the fingerprint recognition sensor 600 on the upper substrate 431 is located between adjacent two rows among the orthographic projections of the color resist blocks 30 and the black matrix 40 on the upper substrate 431.

Referring to FIG. 6, the orthographic projections of the color resist blocks 30 and the black matrix 40 in the color film layer 432 on the substrate are arranged in a plurality of columns, and the orthographic projection of the fingerprint recognition sensor 600 on the upper substrate 431 is located between adjacent two columns among the orthographic projections of the color resist blocks 30 and the black matrix 40 on the upper substrate 431. Therefore, the fingerprint recognition sensor does not affect the displaying of the liquid crystal display device.

According to an embodiment of the present disclosure, a location of the fingerprint recognition sensor is not limited to that shown in FIGS. 5 and 6, and the fingerprint recognition sensor may be located at any position that does not affect the displaying of the liquid crystal display device and at which the light reflected by the fingerprint can be received.

Figure 7:
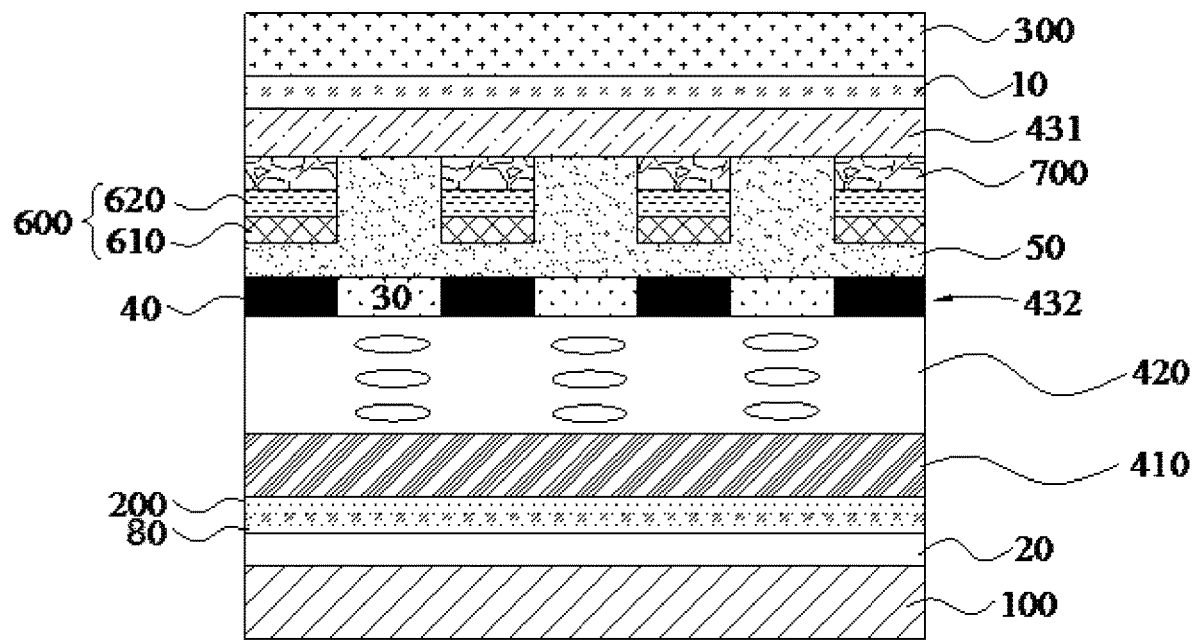
FIG. 7 is a detailed structural schematic diagram of a liquid crystal display device according to another embodiment of the present disclosure.

FIG. 7 is a detailed structural schematic diagram of a liquid crystal display device according to another embodiment of the present disclosure. The liquid crystal display device shown in FIG. 7 has a similar structure to the liquid crystal display device shown in FIG. 3, and only portions shown in FIG. 7 that differ from those shown in FIG. 3 will be described herein in order to avoid repetition.

Referring to FIG. 7, the fingerprint recognition component may further include a filter layer 700 which is located at a side of the fingerprint recognition sensor 600 facing away from the liquid crystal layer 420 and is configured to allow light in a spectral range to pass through. An orthographic projection of the fingerprint recognition sensor 600 on the upper substrate 431 is located within an orthographic projection of the filter layer 700 on the upper substrate 431, and the orthographic projection of the filter layer 700 on the upper substrate 431 and an orthographic projection of the color resist blocks 30 on the upper substrate 431 do not overlap with each other. Thus, the filter layer 700 does not affect the displaying of the liquid crystal display device.

According to an embodiment of the disclosure, a material constituting the filter layer 700 may include a green photoresist material, and the filter layer 700 is configured to allow light with a wavelength of 480 nm to 580 nm to transmit; or, the filter layer 700 may further include a high refractive index film layer and a low refractive index film layer alternately stacked, and the filter layer 700 may be configured to transmit light with a wavelength of 380 nm to 600 nm. Therefore, by disposing the filter layer 700 at the side of the fingerprint recognition sensor 600 facing away from the liquid crystal layer 420, when performing the fingerprint recognition, the light reflected by the fingerprint passes through the filter layer 700 firstly, the filter layer 700 can filter ambient light to reduce an interference of the ambient light on the fingerprint recognition, increase a contrast of a fingerprint recognition image, and further improve the sensitivity of the fingerprint recognition.

Although FIG. 7 illustrates that the filter layer 700 is disposed between the fingerprint recognition sensor 600 and the upper substrate 431, a location of the filter layer 700 is not limited thereto, and the filter layer 700 may be disposed between the first polarizer 10 and the upper substrate 431 or between the first polarizer 10 and the finger contact substrate 300 as long as the filter layer 700 can filter light in a specific wavelength range before the light in the specific wavelength range reaching the fingerprint recognition sensor 600.

According to an embodiment of the present disclosure, the filter layer 700 shown in FIG. 7 is also applicable to the liquid crystal display device shown in FIG. 4.

Materials, thicknesses, and numbers of the high refractive index film layer and the low refractive index film layer in the filter layer are not particularly limited as long as the high refractive index film layer and the low refractive index film layer are matched with each other so that the filter layer can transmit light of 380 nm to 600 nm. For example, the filter layer may be formed by alternately stacking a $Ti_3O_5$ film layer (an example of the high refractive index film layer) and a $SiO_2$ film layer (an example of the low refractive index film layer), or the filter layer may be formed by alternately stacking a $SiN_x$ layer (an example of the high refractive index film layer) and a $SiO_x$ layer (an example of the low refractive index film layer).

Figure 8:
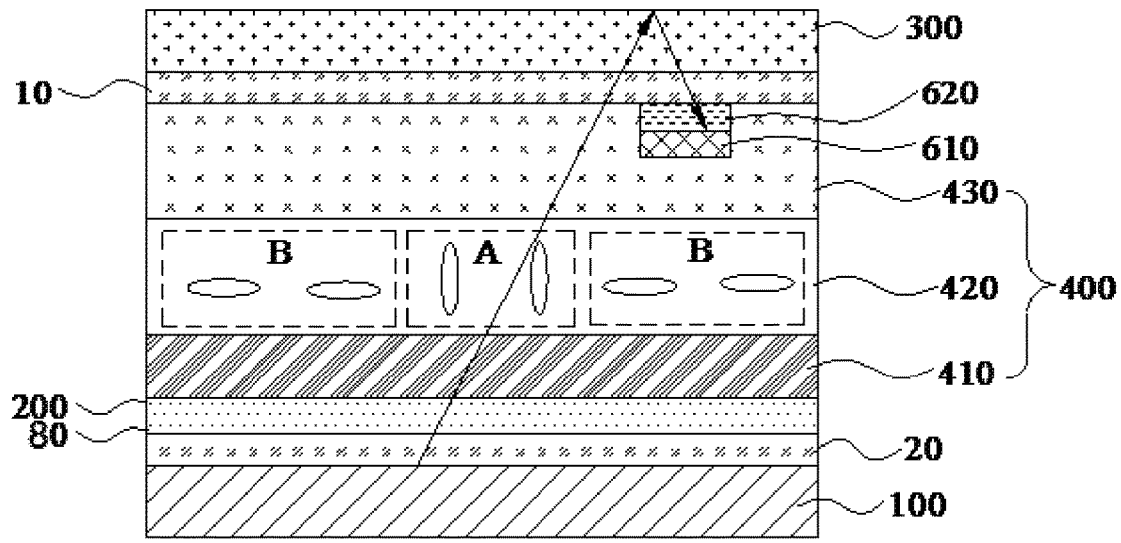
FIG. 8 is a schematic diagram illustrating a liquid crystal display device performing a fingerprint recognition according to an embodiment of the present disclosure.

FIG. 8 is a schematic diagram illustrating fingerprint recognition by the liquid crystal display device according to an embodiment of the present disclosure.

According to an embodiment of the present disclosure, when a finger of a user contacts the finger contact substrate 300, the fingerprint recognition component recognizes the fingerprint. Referring to FIG. 8, when the finger of the user contacts the finger contact substrate 300, a voltage is applied to liquid crystal molecules in a region A, and no voltage is applied to liquid crystal molecules in a region B (or a voltage of zero is applied to the liquid crystal molecules in the region B), which causes the liquid crystal molecules in the region A to deflect and the liquid crystal molecules in the region B to not deflect, so that light emitted from the backlight module 100 can pass through the region A but cannot pass through the region B, that is, the light emitted from the backlight module 100 can irradiate the finger on the finger contact substrate 300 through the light guide layer 80 and the region A in the liquid crystal display panel 400, and light reflected by the finger is received by the fingerprint recognition sensor 600 and converted into an electric signal, so that the fingerprint of the finger is recognized according to the electric signal. Since the light guide layer 80 can guide the light emitted by the backlight module 100 towards the finger contact substrate 300, total reflection of the light between the backlight module 100 and the air layer can be avoided, thus more light will be emitted to the finger, and the sensitivity and accuracy of the fingerprint recognition can be improved.

Hereinafter, an OLED display device will be described with reference to FIG. 9.

Figure 9:
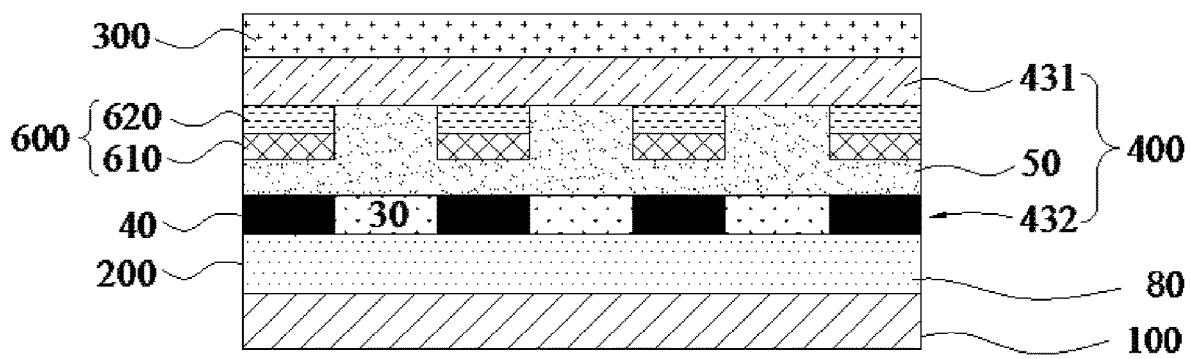
FIG. 9 is a detailed structural schematic diagram of an OLED display device according to an embodiment of the present disclosure.

FIG. 9 is a detailed structural schematic diagram of an OLED display device according to an embodiment of the present disclosure.

Referring to FIG. 9, in the OLED display device, the light source 100 is an OLED package, the OLED display device further includes the capping layer 400 between the OLED package 100 and the finger contact substrate 300, the gap 200 is between the OLED package 100 and the capping layer 400, and the light guide layer 80 at least partially fills the gap 200 (FIG. 9 shows a case where the light guide layer 80 completely fills the gap 200).

According to an embodiment of the present disclosure, the capping layer 400 may include the upper substrate 431 and the color film layer 432. The upper substrate 431 and the color film layer 432 have the same structures as the upper substrate 431 and the color film layer 432 described with reference to FIGS. 3 to 6, and descriptions thereof will not be repeated.

According to an embodiment of the present disclosure, the fingerprint recognition module in the OLED display device may further include the fingerprint recognition sensor 600, and the sensor 600 may include the photodiode 610 and the thin film transistor 620. The fingerprint recognition sensor 600 may be located in the capping layer 400, for example, between the upper substrate 431 and the color film layer 432.

According to an embodiment of the present disclosure, the fingerprint recognition sensor 600 may also be located at a side of the OLED package 100 facing away from the capping layer 400 (not shown in FIG. 9).

According to an embodiment of the present disclosure, the OLED display device may further include a filter layer (not shown in FIG. 9), and the filter layer may be located at a side of the fingerprint recognition sensor 600 for receiving light.

According to an embodiment of the present disclosure, when the fingerprint sensor 600 is located between the upper substrate 431 and the color film layer 432 as shown in FIG. 9, the filter layer may be located at the side of the fingerprint sensor 600 facing away from the light source 100, similar to that shown in FIG. 7, that is, the side of the fingerprint sensor 600 for receiving the light reflected by the finger. However, the location of the filter layer is not limited to the location of the filter layer 700 as shown in FIG. 7, and may be located between the upper substrate 431 and the finger contact substrate 300 as long as the light reflected by the finger can be filtered before reaching the fingerprint recognition sensor 600.

According to an embodiment of the present disclosure, when the fingerprint recognition sensor 600 is located at the side of the OLED package 100 facing away from the capping layer 400, the filter layer may be located between the fingerprint recognition sensor 600 and the OLED package 100 or between the OLED package 100 and the capping layer 400, but the location of the filter layer is not limited thereto, and may also be located in the capping layer 400 or between the capping layer 400 and the finger contact substrate 300 as long as it can filter the light reflected by the finger before reaching the fingerprint recognition sensor 600.

Figure 10:
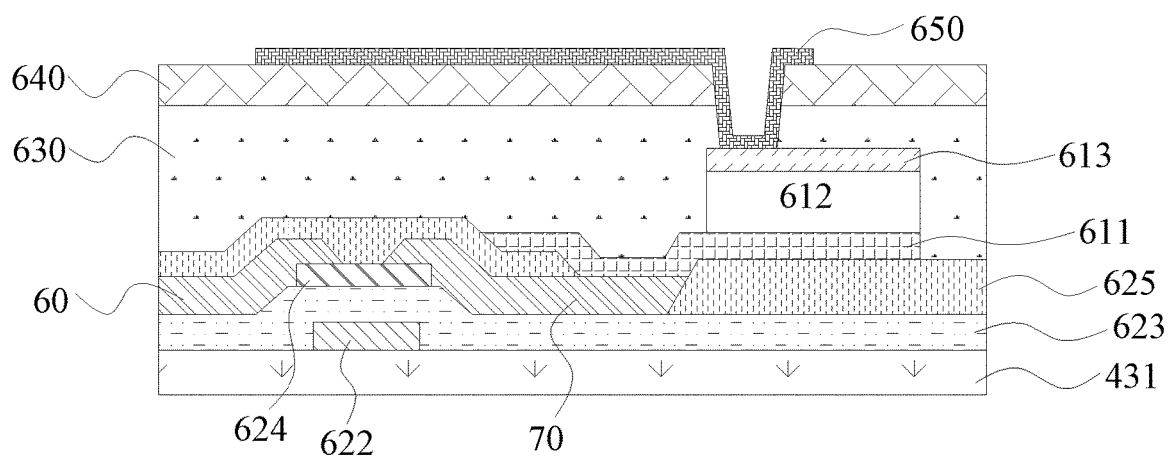
FIG. 10 is a detailed structural schematic diagram of a fingerprint recognition sensor according to an embodiment of the present disclosure.

FIG. 10 is a detailed structural diagram of a fingerprint recognition sensor 600 according to an embodiment of the present disclosure.

Referring to FIG. 10, the thin film transistor 620 in the fingerprint recognition sensor 600 includes a gate electrode 622, a gate insulating layer 623, an active layer 624, a source-drain electrode (including a source electrode 60 and a drain electrode 70), and an insulating layer 625, which are sequentially stacked on an upper substrate 431. The photodiode 610 includes a first electrode 611, a PIN junction 612, and a second electrode 613, which are sequentially stacked on the thin film transistor 620. The first electrode 611 is disposed on a surface of the insulating layer 625 at a side facing away from the gate insulating layer 623, and is electrically connected to the drain electrode 70 in order to electrically connect the photodiode 610 to the thin film transistor 620, so that the photodiode 610 can be controlled to be turned on or off by the thin film transistor 620. A planarization layer 630 in the fingerprint recognition sensor 600 covers the photodiode 610 and the thin film transistor 620, a passivation layer 640 is disposed at a side of the planarization layer 630 facing away from the photodiode 610, a connection electrode 650 in the fingerprint recognition sensor 600 is disposed at a side of the passivation layer 640 facing away from the planarization layer 630, and is electrically connected to the second electrode 613 of the photodiode 610 through a via hole in the passivation layer 640, and a current signal generated by the photodiode 610 can be transmitted to an external circuit through the connection electrode 650, and is analyzed and processed by the external circuit to realize the fingerprint recognition.

According to an embodiment of the present disclosure, the gate electrode 622, the source and drain electrodes 60 and 70, and the connection electrode 650 may be made of metal materials. When the connection electrode 650 is made of a metal material, light may be prevented from being emitted to the active layer of the thin film transistor, so as to prevent adverse effects on electric properties of the thin film transistor.

According to an embodiment of the present disclosure, the light reflected by the finger can be emitted to the photodiode 610 through the gate insulating layer 623 and the insulating layer 625, and in such case, the first electrode 611 of the photodiode 610 is made of a transparent conductive material (e.g., ITO), and the second electrode 613 is made of a metal material.

According to an embodiment of the present disclosure, when the material for forming the filter layer 700 includes the green photoresist material, the filter layer 700 may further serve as the planarization layer 630, and since light needs to pass through the planarization layer before being incident into the photodiode 610, incident ambient light can be filtered, the interference of the ambient light on the fingerprint recognition can be reduced, the contrast of the fingerprint recognition image can be increased, and the sensitivity of the fingerprint recognition can be improved.

According to an embodiment of the disclosure, when the filter layer 700 includes the high refractive index film layer and the low refractive index film layer which are alternately stacked, the filter layer 700 may further serve as the passivation layer 640, and since light needs to pass through the passivation layer before being incident into the photodiode, the incident ambient light can be filtered, the interference of the ambient light on the fingerprint recognition can be reduced, the contrast of the fingerprint recognition image can be increased, and the sensitivity of the fingerprint recognition can be improved.

According to an embodiment of the disclosure, the filter layer formed of the green photoresist further serves as the planarization layer 630, and the filter layer formed by alternately stacking the high refractive index film layer and the low refractive index film layer further serves as the passivation layer 640, so that the interference of the ambient light on the fingerprint recognition can be further reduced, the contrast of the fingerprint recognition image can be increased, and the sensitivity of the fingerprint recognition can be improved.

In the description of the present disclosure, the terms "upper", "lower", and the like indicate orientations or positional relationships based on those shown in the drawings, which are merely for convenience of describing the present disclosure and do not require that the present disclosure must be constructed and operated in such specific orientation, and thus, should not be construed as limiting the present disclosure.

Reference throughout the specification to the description of "an embodiment," "another embodiment," or the like, means that a particular feature, structure, material, or characteristic described in connection with the embodiment is included in at least one embodiment of the present disclosure. In the specification, the illustrative representations of the terms used above are not necessarily intended to refer to the same embodiment or example. Furthermore, the particular feature, structure, material, or characteristic described may be combined in any suitable manner in any one or more embodiments or examples. Moreover, various embodiments or examples and features of various embodiments or examples described in the specification can be combined by those skilled in the art without being mutually inconsistent. In addition, it should be noted that the terms "first" and "second" in the specification are used for a descriptive purpose only and are not to be construed as indicating or implying relative importance or implying the number of the indicated technical features.

While the embodiments of the present disclosure have been shown and described above, it will be understood that the above embodiments are exemplary and not to be construed as limiting the present disclosure, and changes, modifications, substitutions and alterations may be made to the above embodiments by those skilled in the art within the scope of the present disclosure.

The invention claimed is:

1. A display device with a fingerprint recognition function, comprising:
   a light source;
   a fingerprint recognition component comprising a finger contact substrate, the light source and the finger contact substrate having a gap therebetween; and a light guide layer at least partially filling the gap and configured to guide light emitted by the light source towards the finger contact substrate, wherein the light guide layer is a polarizer having haze.

2. The display device with the fingerprint recognition function according to claim 1, wherein the polarizer having the haze partially fills the gap and is at a side of the gap close to the light source.

3. The display device having the fingerprint recognition function according to claim 2, wherein the haze of the polarizer is 5% to 60%.

4. The display device with the fingerprint recognition function according to claim 1, further comprising: a liquid crystal display panel, wherein the light source is a backlight module, the liquid crystal display panel is between the finger contact substrate and the backlight module, and the gap is between the backlight module and the liquid crystal display panel.

5. The display device with the fingerprint recognition function according to claim 4, wherein the liquid crystal display panel comprises: a lower substrate structure, an upper substrate structure and a liquid crystal layer between the upper substrate structure and the lower substrate structure, and wherein the backlight module is at a side of the lower substrate structure facing away from the liquid crystal layer, the finger contact substrate is at a side of the upper substrate structure facing away from the liquid crystal layer, and the gap is between the backlight module and the lower substrate structure.

6. The display device with the fingerprint recognition function according to claim 5, further comprising: a first polarizer and a second polarizer, wherein the first polarizer is between the finger contact substrate and the upper substrate structure, the second polarizer is between the lower substrate structure and the backlight module, and the gap is between the second polarizer and the lower substrate structure or between the second polarizer and the backlight module.

7. The display device with the fingerprint recognition function according to claim 6, wherein the upper substrate structure comprises an upper substrate and a color film layer, wherein the color film layer is at a side of the upper substrate close to the liquid crystal layer and comprises a plurality of color resist blocks.

8. The display device with the fingerprint recognition function according to claim 7, wherein the fingerprint recognition component further comprises a fingerprint recognition sensor between the upper substrate and the color film layer, the color film layer further comprises a black matrix between the plurality of color resist blocks, and an orthographic projection of the fingerprint recognition sensor on the upper substrate and an orthographic projection of the plurality of color resist blocks do not overlap with each other.

9. The display device with the fingerprint recognition function according to claim 7, wherein the fingerprint recognition component further comprises a fingerprint recognition sensor in the color film layer and between the plurality of color resist blocks.

10. The display device with the fingerprint recognition function according to claim 8, wherein the fingerprint recognition component further comprises a filter layer configured to allow light within a spectral range of the filter layer to pass through, the filter layer is at a side of the fingerprint recognition sensor facing away from the liquid crystal layer, the orthographic projection of the fingerprint recognition sensor on the upper substrate is within an orthographic projection of the filter layer on the upper substrate, and the orthographic projection of the filter layer on the upper substrate and the orthographic projection of the plurality of color resist blocks on the upper substrate do not overlap with each other.

11. The display device with the fingerprint recognition function according to claim 10, wherein the spectral range is 380 nm to 600 nm, or 480 nm to 580 nm.

12. The display device with the fingerprint recognition function according to claim 1, wherein the light source is an organic light emitting diode package, and the display device with the fingerprint recognition function further comprises a capping layer between the organic light emitting diode package and the finger contact substrate, and the gap is between the organic light emitting diode package and the capping layer.

13. The display device with the fingerprint recognition function according to claim 12, wherein the fingerprint recognition component further comprises a fingerprint recognition sensor in the capping layer or at a side of the organic light emitting diode package facing away from the capping layer.

14. The display device with the fingerprint recognition function according to claim 13, further comprising: a filter layer at a side of the fingerprint recognition sensor for receiving light reflected by a finger.

15. The display device with the fingerprint recognition function according to claim 9, wherein the fingerprint recognition component further comprises a filter layer configured to allow light within a spectral range of the filter layer to pass through, the filter layer is at a side of the fingerprint recognition sensor facing away from the liquid crystal layer, an orthographic projection of the fingerprint recognition sensor on the upper substrate is within an orthographic projection of the filter layer on the upper substrate, and the orthographic projection of the filter layer on the upper substrate and an orthographic projection of the plurality of color resist blocks on the upper substrate do not overlap with each other.

* * * * *